Inventors:
Herbert A. Merges
Josef Pasteka

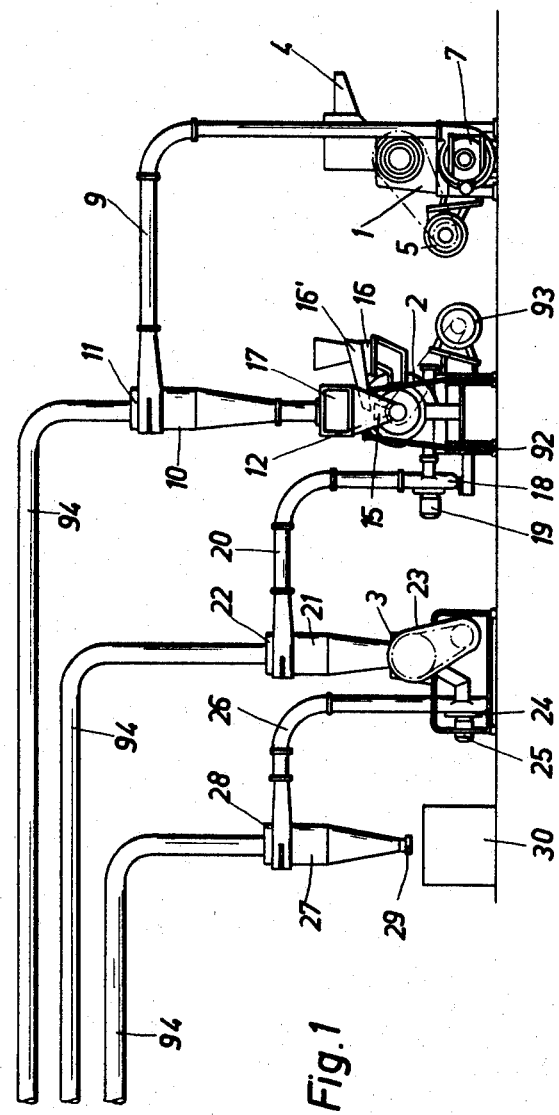
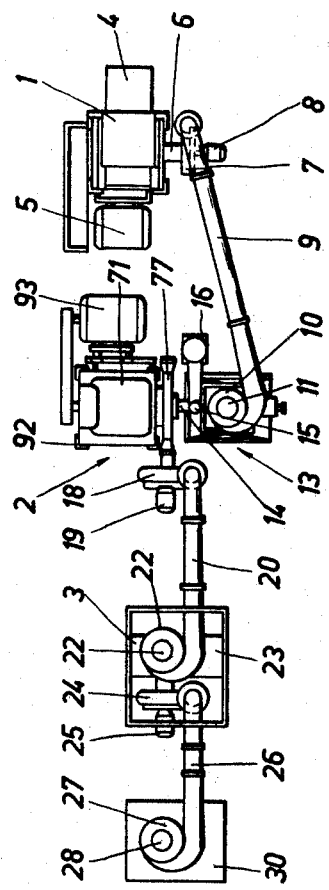
Fig.1
Fig.2

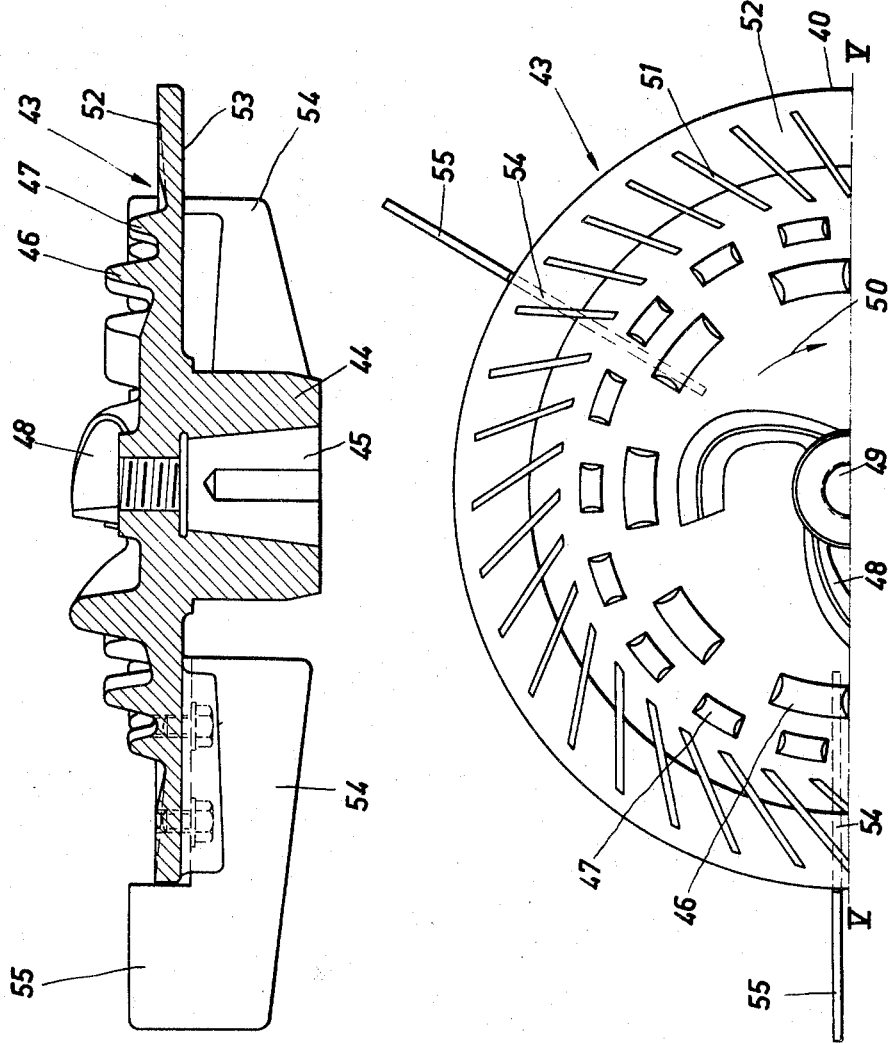

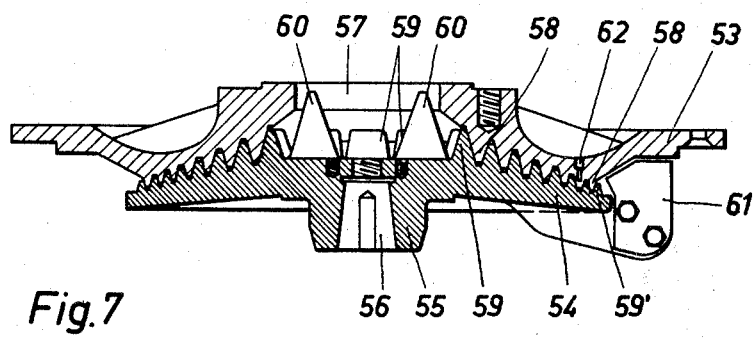
Fig. 7
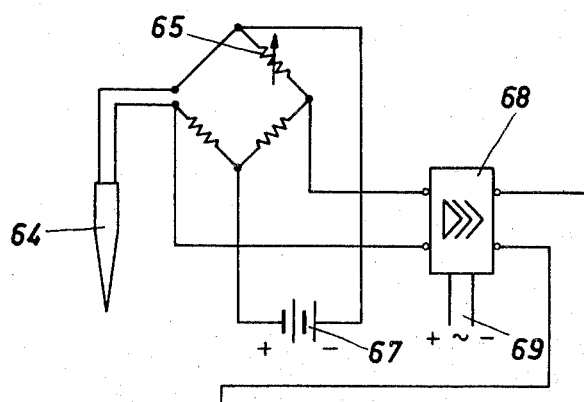
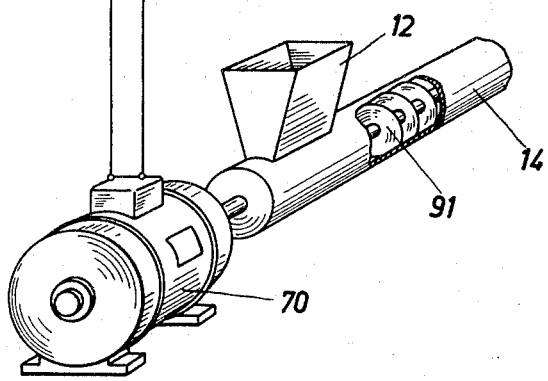
Fig. 8

United States Patent Office 3,389,203
Patented June 18, 1968

3,389,203
METHOD AND APPARATUS FOR GRANULATING PIECES OF THERMOPLASTIC SYNTHETIC RESIN FILM
Herbert A. Merges, Werkstrasse 1, Wolfgang, Germany, and Josef Pasteka, Am Laubersberg 19, Steinheim, Germany
Filed June 23, 1964, Ser. No. 377,207
Claims priority, application Germany, June 29, 1963, U 9,924
16 Claims. (Cl. 264—140)

ABSTRACT OF THE DISCLOSURE

Pieces of thermoplastic synthetic resin film are granulated by feeding the pieces between two cooperating, spaced comminuting elements which produce frictional heat by rotation of one element relative to the other. The feed rate of the pieces into the heating zone is controlled and correlated with the rotational speed and the spacing between the elements so that the frictional heat melts the resin pieces together into the size of granules.

---

The present invention relates to the preparation of thermoplastic scrap material for re-use. More specifically, this invention is concerned with a method and apparatus for granulating pieces of thermoplastic synthetic resin film, such as pieces of polyvinyl chloride, polyethylene, polypropylene, or the like, by melting the pieces together.

As is well known, the fabrication and processing of thermoplastic materials are accompanied by large amounts of scrap. For economical reasons it is desirable to rework the scrap, by which is meant the conversion of the film scrap into granules from which thermoplastic articles of any desired shape may then easily be made by injection molding or similar processes.

Heretofore, thermoplastic film scrap has been prepared for re-use in different ways. According to one process, batches of pieces of thermoplastic film are placed in heated drums, which are provided with agitating or pulverizing elements and in which the pieces are subjected to heat until they have melted together. According to another method, the pieces of thermoplastic film are first reduced in size, whereupon they are compressed and melted together in an extruder. With both methods the quality of the film pieces is considerably deteriorated because of the excessive heat to which the film scrap is exposed. The scrap must be subjected to relatively high temperatures over a long period of time to cause all pieces to melt together. With these batch-type or discontinuous methods the film pieces are melted together to lumps of larger size which have to be reduced in size, prior to further processing.

It is accordingly a primary object of the invention to provide a method in which the disadvantages heretofore encountered in the reworking of thermoplastic film scrap are eliminated.

It is another object of the invention to permit pieces of thermoplastic synthetic resin film to be re-used by forming them into granules.

Another object of the invention is to provide a method of granulating pieces of thermoplastic synthetic resin.

A further object of the invention is to provide a method of shaping thermoplastic film pieces into granules that may be re-used without further reworking.

Still another object of the invention is to provide a method of shaping thermoplastic film pieces into elongated rods that have to be reduced to granules, prior to further processing.

A further object of the invention is to produce frictional heat to which the film pieces are subjected for a short period of time, until the melting temperature of the pieces is almost or, essentially, reached.

Another object of the invention is to combine the granulation process with the step of coloring the film pieces.

Still another object of the invention is to provide apparatus for carrying out the objects set forth hereinbefore.

In contrast to the above-described methods heretofore applied the present invention provides a method wherein pieces of thermoplastic film material may be granulated as follows:

In a rotary cutter of conventional design the film scrap is cut into smaller pieces passing through a mesh of about 8 to 12 mm. The so obtained pieces have a small apparent density. That is to say, their weight per liter may range from about 0.05 kg. to about 0.1 kg., depending upon the kind of material employed. The cutting process is carried out at normal or room temperature, that is, at a temperature of about 10° C. to 25° C. This temperature is maintained by a blower which serves to draw the film pieces through the cutter and a pipeline communicating therewith to an air separator where they drop into the hopper of a feeder. The purpose of the feeder is to feed the pieces, as by a conveyor screw, in predetermined quantities to a mill that constitutes the most important element of the system and in which the film pieces are momentarily subjected to frictional heat. If desired, coloring matter may be added to the resin film pieces as they are fed to the mill, so that a colored granulate may be obtained.

The frictional heat to which the resin film pieces are exposed, is produced by the relative rotation of two cooperating, spaced comminuting elements, sometimes hereinafter referred to as discs, the heat causing the film pieces to begin to melt so that they fuse together into larger size structures. This process is carried out at a high speed as the resin film pieces travel from the center of the comminuting elements to the periphery thereof.

Thus, by employing a mill or some similar type of pulverizer in the method of the invention, an effect will be attained that is the very opposite of the purpose for which such a mill is intended. In other words, the film pieces fed into the mill will not be comminuted. Rather they will be caused to melt together into granules. Accordingly, the term "melt together" as used herein refers to the shaping of the substantially two-dimension film pieces into substantially three-dimensional structures.

The process briefly described above is governed by a plurality of parameters, such as the rotational speed of the rotatable elements, the feed rate, the melting temperature, which depends on the kind of thermoplastic scrap employed, etc., for which no exact, generally applicable data or ranges of numerical values can be given because of the great diversity of the factors involved.

Further details and the specific shape of the rotatable elements will become apparent from the detailed description of the method and apparatus of the invention.

Depending upon the type of mill employed, and, further, depending upon the particular properties of the material to be reworked, the film pieces, when melted together, may have the shape of granules, or, alternatively, of elongated rods, as will be explained hereinafter. The granules may be used in the fabrication of thermoplastic articles without requiring further reworking, whereas the film pieces that were shaped into elongated rods have to be reduced in size to obtain a granulate having the desired size.

The process and apparatus of the invention have the advantage that the product obtained by practicing the invention can be processed to structures of various shapes.

Another advantage results from the fact that in conjunction with the apparatus of the invention the method of the invention can be carried out continuously.

Still another advantage of the invention consists in that no special heating equipment is required to produce a granulate that is capable of being processed. Furthermore, the film scrap is only momentarily exposed to heat thereby avoiding impairment of the quality of the product.

A further advantage of the invention is that the rotatable elements which serve to produce the frictional heat by acting on the resin film pieces are also operative to act as kneading elements whereby the slightly molten film pieces will at once be shaped into granules or elongated rods.

Further objects and advantages of the method and apparatus of the invention will become apparent from the following detailed description of the apparatus, reference being had to the accompanying drawings, in which FIGURE 1 is a general view showing the overall system for carrying out the method of the invention;

FIGURE 2 is a plan view of the system of FIG. 1;

FIGURE 5 is a partial plan view of the rotatable comminuting element;

FIGURE 6 is a cross-sectional view of the element of FIG. 5 along the line V—V;

FIGURE 7 is another embodiment of two comminuting elements having teeth of different sizes;

FIGURE 8 is a circuit diagram of a control device for automatic control of the feed rate;

Figure 3:
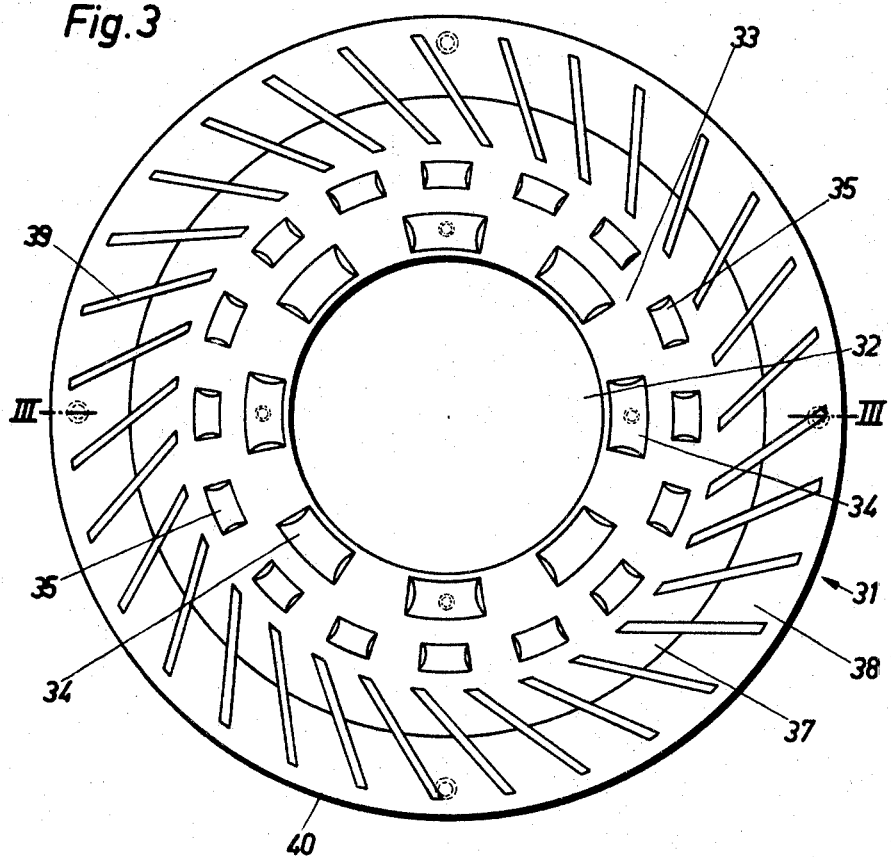
FIGURE 3 is a plan view of the stationary comminuting element.

Referring now more particularly to FIGS. 1 and 2, there is shown the overall system which consists essentially of a first rotary cutter 1, a friction disc mill, such as a toothed disc mill 2, a second rotary cutter 3, and the necessary piping, such as pipelines 9 and 20, interconnecting the apparatus of the invention. The scrap, such as thermoplastic film, film pieces, or the like, is placed in a feed hopper 4 from which it is fed to rotary cutter 1, which is driven by suitable driving means, such as a motor 5. The screen (not shown) of rotary cutter 1 has a mesh of 8 to 12 mm. Beneath the discharge outlet of cutter 1 a receiving hopper is provided which is in communication with a suction line 6, the other end of which terminates in a blower 7 which is driven by suitable driving means such as a motor 8. At the positive pressure side blower 7 communicates through a pipeline 9 with an air separator 10, in which the reduced film scrap is separated from the delivery air, which flows off through an exhaust 11. From air separator 10 the thermoplastic film pieces drop into a hopper 12 of a feeder generally indicated at 13 in FIG. 2. Feeder 13 comprises essentially a conveyor screw (designated by the reference numeral 91 in FIG. 8) which is enclosed by a pipe or trough 14 that is in direct communication with the feeding inlet of mill 2. In the illustrated embodiment, the drive shaft of mill 2 is shown horizontally disposed. Feed screw 91 (FIG. 8) is driven by suitable driving means, such as a geared motor unit (not shown in FIGS. 1 and 2), and its speed is conventionally variable, depending upon the desired feed rate. A hopper 15 communicates with trough 14 at the front end of conveyor screw 91, which hopper, in conjunction with a feeding device 16 located above the hopper, serves to feed coloring matter to mill 2, if it is desired to obtain a colored granulate. A chute 16' which can be set into oscillation, permits the coloring matter to be fed to mill 2 in exactly predetermined quantities.

To ascertain whether feed hopper 12 is filled properly, one of its walls may be made from a transparent material 17, such as glass. In the embodiment shown, the mill housing accommodating the comminuting or friction elements is connected at its negative pressure side to a blower 18 which is driven by suitable means, such as a motor 19. At its positive pressure side, blower 18 communicates through a pipeline 20 with an air separator 21 whence the delivery air leaves the system through an exhaust 22.

In air separator 21, the thermoplastic film pieces which have been melted together to larger size structures in mill 2, are dropped into a second rotary cutter 3, 23 whose screen (not shown) has a mesh of 5 to 8 mm.

After leaving rotary cutter 23, the finished granulate may be dropped into a storage bin disposed beneath cutter 23. Alternatively, the granulate may be conveyed to another air separator 27 whence it drops through the lower discharge outlet 29 into a storage bin 30, as shown. To this end, a blower 24 is in communication with a pipeline 26, the other end of which terminates in air separator 27. Blower 24 is driven by suitable means, such as a motor 25, the delivery air leaving air separator 27 through an upper exhaust 28.

Each of the rotary cutters 1 and 23 comprises essentially a housing in which a shaft is horizontally, rotatably mounted. The shaft carries a rotor having a plurality of blade members. A screen having the above-specified mesh is arranged in such a manner that the rotor is enclosed by the screen about half its periphery.

Figure 9:
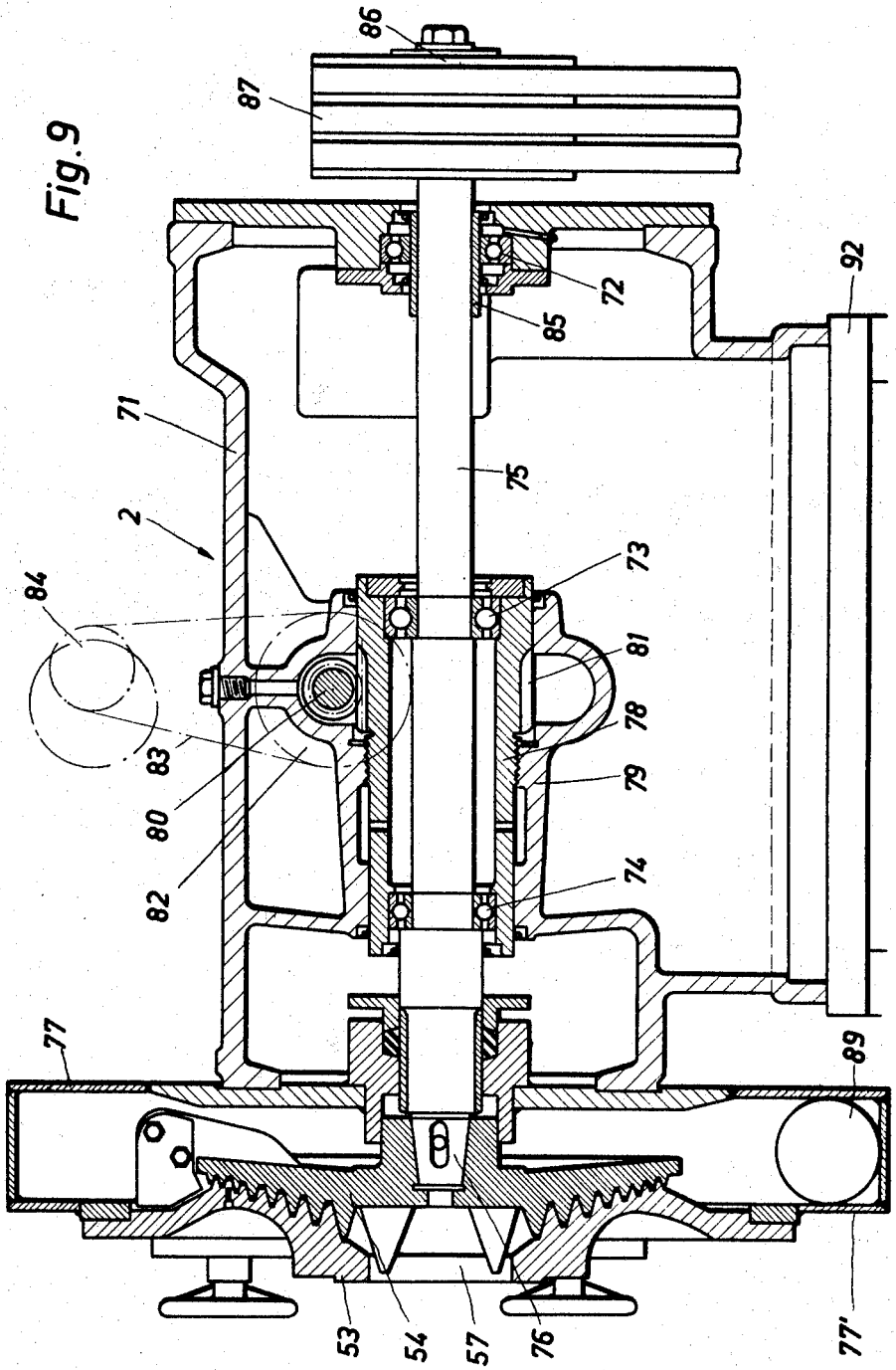
FIGURE 9 is a cross-sectional view of the mill in which the granulation proper takes place.

Mill 2 which is shown in greater detail in FIG. 9 and in which the thermoplastic film pieces are granulated by melting together, will be more fully described hereinafter. Prior to the description of the construction of mill 2, the elements for generating the frictional heat will be described first. In FIGS. 3 through 7, a few embodiments of these elements are shown.

Figure 4:
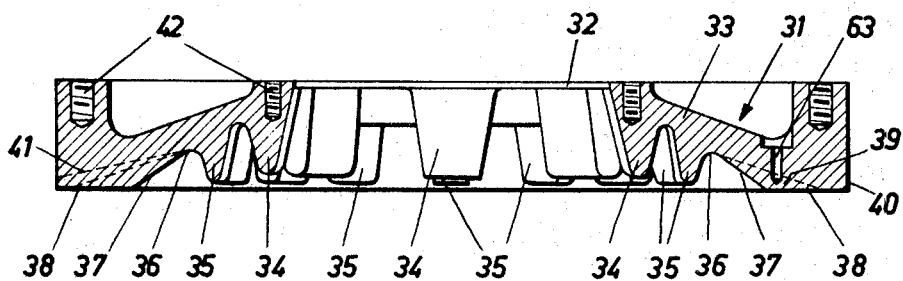
FIGURE 4 is a cross-sectional view of the element of FIG. 3 along the line III—III.

In FIGS. 3 and 4 a stationary toothed disc is shown which is generally designated by the reference numeral 31, and in FIGS. 5 and 6 a rotatable toothed disc, generally indicated at 43, is shown which is rotatably mounted on a shaft and is adapted to cooperate with the stationary toothed disc of FIGS. 3 and 4, as will be explained more fully in the description of FIG. 9.

As shown in FIGS. 3 and 4, the stationary disc 31 has a central hole 32 and an inner annular ring portion 33 which carries two rows 34, 35 of tooth-like elements which are arranged in such a manner that two concentric circles are formed. Teeth 34 are disposed in spaced relationship adjacent to hole 32, the spacing of successive teeth being approximately equal to the length of one tooth 34. The second tooth row comprises teeth 35 which are smaller than teeth 34, the number of the former being about twice as high as that of the latter. Beginning from the bottom land 36 of the small-size tooth elements 34, an annular disc portion 37 gradually increases in thickness and finally terminates in a plane outer annular disc portion 38.

In disc 31 slots 39 are provided, as by cutting, which extend between the tapered disc portion 37 and the outer annular disc portion 38 and which may terminate in disc 31 either in proximity to the disc periphery 40, as shown in FIG. 3, or direct at the disc periphery 40, as indicated by line 41 in FIG. 4. Slots 39 are not radially arranged. Instead, each of them is inclined by an angle of about forty-five degrees with respect to its corresponding radius.

Threaded holes 42 are provided in toothed disc 31 on its rear side to permit the disc to be secured to the mill housing or cover by suitable means, such as screws.

As shown in FIGS. 5 and 6, disc 43 is substantially similarly constructed as disc 31, except that disc 43 has a hub portion 44 which is integral with disc 43 and serves to mount the disc on a shaft for rotation therewith. A hole 45 in hub portion 44 accepts the shaft at its one end. The teeth of disc 31 are disposed within the disc plane, while the teeth of disc 43 protrude from the disc plane. To insure meshing of the teeth of discs 31 and 43, teeth 46 and 47 are arranged along concentric circles having respectively larger diameters than the concentric circles along which the teeth of disc 31 are disposed, the arrangement being such that teeth 46 of disc 43 interact with teeth 34 and 35 of disc 31, while teeth 47 of disc 43 interact with teeth 35 and the tapered disc portion 37 of disc 31. Disc 43 has only a small central threaded hole 49 to permit the disc to be secured to the shaft end by suitable screw means.

In its central region disc 43 has wing-shaped members 48 which are bent back with respect to the direction of rotation as indicated by an arrow 50, the purpose of members 48 being to draw in the material to be granulated. Disc 43 has also slots 51 in its peripheral portion 52, which slots are arranged and shaped in the same manner as slots 39 or 41. Thus, when the discs are mounted together thereby engaging each other, slots 39 and 51 will extend substantially at right angles.

The outer diameter of disc 31 is equal to that of disc 43. Wing-shaped members 54 are disposed on disc 43 at its rear side, whose outwardly extending portions 55 project from the disc plane and serve to remove the granulated material.

In FIG. 7 two slightly modified discs 53 and 54 are shown as being in mesh with each other. Disc 53 is stationary, while disc 54 is mounted on a shaft (not shown) for rotation therewith. To this end, disc 54 has a hub portion 55 in which a hole 56 is provided for receiving the shaft. The stationary disc 53 may be simultaneously used as cover for the mill housing. The thermoplastic film pieces are fed into the mill through a hole 57 in disc 53 to which trough 14 (FIG. 8) enclosing conveyor screw 91 (FIG. 8) may for instance be flange-mounted. Teeth 58, 59 of discs 53, 54 respectively differ from those of discs 31 and 43 in that they are arranged along concentric circles across the entire face of discs 53, 54, the arrangement being such that corresponding ones of teeth 58 engage corresponding ones of teeth 59, the teeth arranged along adjacent concentric circles being slightly smaller than the teeth arranged along the corresponding, next inner circle. In the central region of rotary disc 54, a few large-size teeth 60 are provided which serve to draw in the film pieces.

Although not clearly shown in the drawings, it should be understood that teeth 58, 59, like teeth 34, 35, 46, 47 previously described, are arranged in spaced relationship. Furthermore, disc 54 has at least one wing member 61 for removing any material from the outermost regions of the heating zone. Unlike discs 31 and 43, discs 53 and 54 have no slots. Instead, the thermoplastic film pieces which have been shaped into granules leave the heating zone at the last row of teeth 59'. To permit the use of a heat sensing element 64, a blind hole 62 may be provided in the stationary disc 53. For the same reason, a hole 63 (FIG. 4) may be provided in disc 31.

The feed rate control includes the heat sensing element 64, a bridge circuit comprising a variable resistor 65 for setting the desired value and two resistors 66, a direct-current source 67, an amplifier 68, an alternating current source 69 across which the amplifier is connected, and a DC geared motor unit 70 which is connected to amplifier 68. As shown, the heat sensing element 64 is connected in bridge connection to direct-current source 67 and amplifier 68. The feed screw 91 (FIG. 8) which is enclosed by trough 14 (FIG. 2) is driven by gear motor 70, whose speed depends upon the particular adjustment and temperature. Alternatively, the feed rate may be controlled by regulating a servomotor having an infinitely variable gear. In this case, basically, the same electrical circuit could be employed.

However, it should be understood that the temperature dependent feed rate control described in conjunction with FIG. 8 is not necessary in carrying out the method of the invention. In other words, the adjustment of the speed of the screw conveyor may be effected independent of the temperature, since for a given material the temperatures prevailing at the comminuting elements will remain substantially uniform once the process has started.

To this end, and as will be described in greater detail in the examples, the discs are initially brought into engagement as much as possible, whereupon the material is fed to mill 2 in a predetermined quantity and the rotatable disc is then axially moved away from the stationary disc, until a product having the desired shape is obtained. If the rotational speed of the screw conveyor is reduced or increased, the product will change its shape and size, so that re-adjustment of the discs may become necessary. Thus, it is seen that the above-described automatic control may be dispensed with, although there may be certain cases in which automatic control would prove advantageous.

In the following, mill 2 will be described in which the elements for producing the frictional heat are accommodated and in which the granulation proper takes place. For a better understanding, reference will now be made to FIG. 9, which is a detailed cross-sectional view of mill 2.

In a bearing housing 71 a shaft 75 is rotatably mounted in bearings 72, 73, and 74. Shaft 75 extends with its one end 76 into a casing 77 in which the toothed discs 53, 54 serving as friction elements are accommodated, with disc 54 acting as rotatable friction element mounted on end 76 of shaft 75. Of course the discs shown in FIGS. 3 through 6 may be substituted for discs 53, 54, if desired. The spacing of friction discs 31 and 43 or 53 and 54 is adjustable because of the axial movability of shaft 75. For this purpose, bearings 73 and 74 are seated in a bushing member 78 that is disposed in a bearing casing 79 and is axially slidable therein. Axial displacement of bushing member 78 is effected through a worm 80 which is adapted to engage correspondingly shaped teeth 81 on bushing 78. To the shaft carrying worm 80 either a handwheel (not shown) or a chain wheel 82 may be secured, which is adjustable through a chain 83 and driving means 84. To insure axial movability, shaft 75 must also be slidable in bearing 72. To this end, a bushing member 85 is disposed between shaft 75 and bearing 72, as shown. A driving pinion 87 is mounted on end 86 of shaft 75.

A description of further details concerning the bearings of shaft 75, such as lubrication and sealing means, etc., is deemed unnecessary, because such means as well as their arrangement are already well known to the art.

Also it should be understood that other suitable means may be employed to effect axial displacement of shaft 75.

Figure 10:
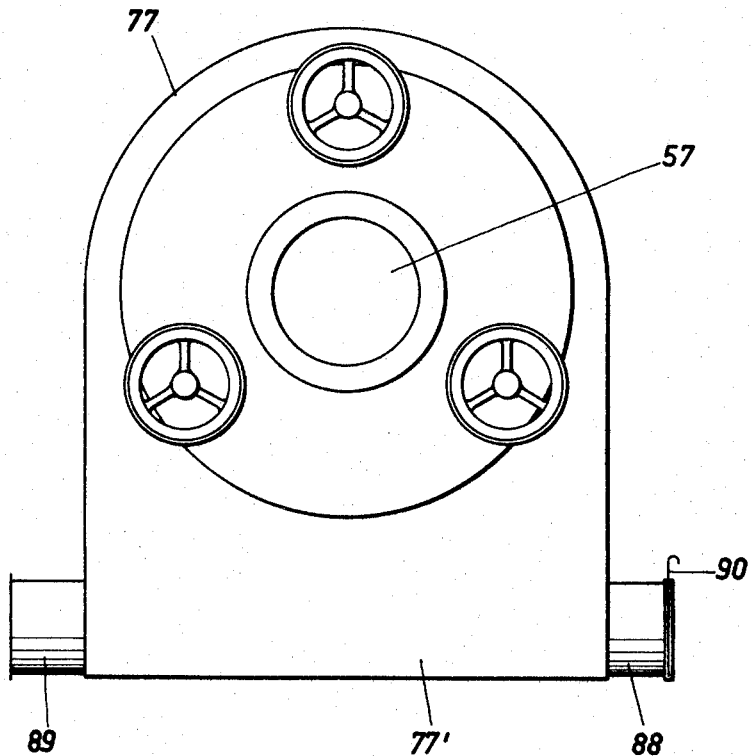
FIGURE 10 is a front view of the mill of FIG. 9.

As shown in FIG. 10, the friction-disc casing 77 has a downwardly extending portion 77' with two pipe-socket members 88 and 89. Socket 88 has a slide 90 for regulating the supply of air. Socket 89 connects to blower 18 (FIGS. 1 and 2) at the negative pressure side thereof, and holes 57 serves to establish communication betwen the mill and the pipe or trough 14 enclosing feed screw 91. In the illustrated embodiment mill 2 rests on a supporting structure schematically indicated at 92. Shaft 75 is driven by suitable means, such as a motor 93 (FIGS. 1 and 2).

The overall system described hereinbefore operates as follows:

The thermoplastic film or film scrap is placed in hopper 4 and fed to rotary cutter 1 in which the scrap is cut into flakes. A stream of air produced by blower 7 carries the flakes through pipeline 9 to air separator 10 in which they are separated from the air and dropped into hopper 12, while the air leaves the system through exhaust 11. Upon entering the feeder 13 comprising conveyor screw 91 and trough 14, the film pieces are forced through aperture 57 in the stationary toothed disc 53 in exactly predetermined quantity into the heating zone defined by the opposite faces of the cooperating discs 31 and 43 or 53 and 54, where they melt together into granules or elongated rod-like structures in the manner described above. Upon leaving the heating zone through the space between the toothed discs at the periphery of the latter the granulated product is removed by the air stream in lower housing portion 77', with wing members 55 or 61 assisting in the removal. In addition to removing the product, the air stream also serves the purpose of cooling the discs and the granulated product. If desired, coloring matter may be added to the film pieces in an amount of about 0.5 to 2% of the resin charge, the coloring matter being fed to trough 14 by feeding device 16 comprising vibrating chute 16'.

The granular or elongated rod-like pieces are then fed by the air stream of blower 18 through line 20 to air separator 21 in which they are separated from the delivery air and dropped into rotary cutter 23 in which they are cut into granules of the desired size. Thereafter, the product may again be removed by a stream of air of blower 24, which stream conveys the product through line 26 and another air separator to storage bin 30. The air leaving air separators 10, 21, and 27 is exhausted through pipelines 94 shown in FIG. 1.

To attain the desired granulation effect, it is most important that the feed rate of the resin film pieces, the rotational speed of the rotatable disc, and the spacing of the two discs be properly controlled and correlated. In view of the distinct properties of the thermoplastic synthetic resin films to be granulated it is obvious that no rules can be given which would be generally applicable to all materials that may be reworked under the teachings of the invention. Rather the control and correlation of the parameters set forth above will depend upon the particular material to be reworked.

Generally, the spacing of the comminuting elements or discs is adjusted first as close as possible. Subsequently, the screw conveyor feeding the film pieces into the heating zone between the two comminuting elements is started, whereupon the spacing of the comminuting elements is made larger by axially displacing the shaft on which the rotatable element is mounted, until the desired product is obtained.

In this connection it should be noted that materials having a high melting point, such as polypropylene, require more frictional heat than do materials having a lower melting point. Thus, to granulate materials having a high melting point, the apparatus may be operated at higher speeds, and discs having a large number of teeth may be employed. Furthermore, the spacing of the discs may be reduced in this case.

Conversely, the granulation of materials having a lower melting point, such as polyethylene and polyvinyl chloride, is carried out at lower speeds and with the toothed discs arranged with a greater space therebetween. Of course the thickness of the thermoplastic film which may vary between 0.01 mm. and 2 mm., plays also a certain role. However, it should be noted that although certain empirical values have to be considered in practicing the invention, which values were already obtained from experience, nevertheless, the granulation is basically carried out as disclosed herein to obtain the desired product, irrespective of the kind of material that is to be reworked.

For comminuting elements or discs having a diameter for instance between 300 and 350 cm. the resin charge may be determined by correlating the resin charge and the melting temperature, that is, by dividing the resin charge per hour by the melting temperature in ° C., the obtained value being expressed in terms of kg./hr. ° C. Thermoplastic films being mostly made from such materials as polyvinyl chloride, polyethylene, and polypropylene, and the melting temperatures of these materials being known, it is thus possible to determine the appoximate resin charge by inserting the obtained values as expressed in terms of kg./hr. ° C.

In the following Examples I through III, the method of the invention is described as applied in reworking certain thermoplastic synthetic resins.

Example I

Scrap of polyethylene film having a softening point of about 115° C. was fed into a rotary cutter of conventional design and cut, by the action of the rotating blades, into flakes that had a size of about 8 to 12 mm. These flakes, which had a density of about 0.08 kg. per liter, were conveyed by a stream of air produced by a blower into the feeder, which was adjusted to feed the flakes at a rate of about 100 to 110 kg. per hour into the toothed disc mill. The toothed discs of the mill were constructed as shown in FIGS. 3 through 6. The rotatable disc was driven at a speed of 490 r.p.m.

The spacing of the discs depends upon the thickness of the flakes and varied from 1 to 5 mm. as measured between the plane face portions of the discs. Preferably, the discs were initially adjusted in such a manner that the spacing between them was very small. With the flakes travelling through the mill, the spacing was then increased until the flakes melted into pieces of the desired size. These pieces had the shape of small elongated rods and were removed from the mill by a stream of air and fed to an air separator from which they were dropped into another conventional rotary cutter, the screen of which had a mesh of 5 mm. The granules that were obtained after the pieces had passed through the cutter, were workable and had a density of about 0.3 to 0.35 kg. per liter. With this example, the resin charge may be roughly determined from the value 0.6 to 1.5 kg./hr. ° C. That is to say, the resin charge lies within the range from about 70 kg./hr. to about 170 kg./hr. Hence, the selected resin charge in this case was almost equal to the average.

Example II

Scrap of polypropylene film having a softening point of about 160° C. to 170° C. was fed into a rotary cutter of conventional design and cut, by the action of the rotating blades, into flakes that had a size of about 8 to 12 mm. These flakes, which had a density of about 0.08 kg. per liter, were conveyed by a stream of air produced by a blower into the feeder which was adjusted to feed the flakes at a rate of about 75 kg. per hour into the toothed disc mill. The toothed discs of the mill were constructed as shown in FIGS. 3 through 6. The rotatable disc was driven at a speed of 840 r.p.m.

The spacing of the discs depends upon the thickness of the flakes and varied from 1 to 3 mm. as measured between the plane face portions of the discs. Preferably, the discs were initially adjusted in such a manner that the spacing between them was very small. With the flakes travelling through the mill, the spacing was then increased until the flakes melted together into pieces of the desired size. These pieces had the shape of large drops and were removed from the mill by a stream of air and fed to an air separator where they were dropped into another conventional rotary cutter, the screen of which had a mesh of 5 mm. The granules that were obtained after the drop-shaped pieces had passed through the cutter, were workable and their density was about 0.36 kg. per liter. The resin charge is determined as described in Example I, proceeding from the value of 0.5 to 0.6 kg./hr. ° C.

Example III

Scrap of plasticized PVC film having a melting point of about 135° C. was fed into a rotary cutter of conventional design and cut into flakes of a size of 8 to 12 mm. These flakes, which had a density of about 0.1 kg. per liter, were conveyed by a stream of air produced by a blower into the feeder which was adjusted to feed the flakes at a rate of about 115 kg. per hour into the toothed disc mill. The toothed discs of the mill were constructed as shown in FIG. 7. The rotatable disc was driven at a speed of 490 r.p.m. The spacing of the discs depends upon the thickness of the flakes and varied from about 1 to 3 mm. as measured between top land and bottom land. Preferably, the discs were initially adjusted in such a manner that the spacing between them was very small. With the flakes travelling through the mill, the spacing was then increased until the flakes melted together into pieces of the desired size. These pieces had the form of granules and because of their irregular shape were removed from the mill by a stream of air and fed to an air separator where they were dropped into another rotary cutter, whose screen had a mesh of 5 mm. The product that was obtained by passing the granules through the second rotary cutter had a density of 0.47 kg. per liter, the maximum size of the finished granules corresponding to a mesh of 5 mm. The resin charge is determined as described in Example I, proceeding from the value 0.5 to 1.6 kg./hr. 0° C.

While the novel features of the invention as applied to a preferred embodiment have been shown and described herein, it will be obvious that modifications of the apparatus illustrated may be made without departing from the spirit and the scope of the invention. Thus, it is not absolutely necessary that the film pieces be conveyed by air. Moreover, it is possible to use compressed air for removing the fused pieces from the heating zone and feeding them to the second rotary cutter. Accordingly, the scope of this invention is to be governed by the language of the following claims construed in the light of the foregoing description of this invention.

It is claimed and desired to secure by Letters Patent:

1. A method of granulating pieces of thermoplastic synthetic resin film having a planar dimension in any direction in the range of about 8 to 12 mm., comprising the steps of establishing a heating zone for said thermoplastic synthetic resin film pieces in the space between two cooperating, spaced comminuting elements; feeding the pieces into said heating zone; producing frictional heat in said zone by rotating at least one of the cooperating, spaced comminuting elements, said one element being rotated at a speed sufficient so that the frictional heat reaches the melting temperature of the thermoplastic synthetic resin and the film pieces melt together between the comminuting elements at least into the size of granules having a minimum dimension in all directions of about 2 mm., and removing the latter from the heating zone by a stream of air of no more than room temperature.

2. The method of claim 1, wherein the film pieces are shaped into elongated rods in the heating zone between the comminuting elements, the air stream removes the rods into a cutting zone, and the rods are cut in the cutting zone into granules passing through a mesh of about 2 to 5 mm.

3. The method of claim 1, wherein pulverulent coloring matter is added to the film pieces, prior to feeding the latter into the heating zone.

4. The method of claim 1, further comprising the preliminary step of cutting thermoplastic synthetic resin film at room temperature into said pieces.

5. The method of claim 1, wherein the thermoplastic resin is polyvinyl chloride, and is being fed to said zone at a rate of for each 0.5 to 1.6 kg., of resin per hour ° C. of the melting temperature.

6. The method of claim 1, wherein the thermoplastic resin is polypropylene, and is being fed to said zone at a rate of 0.5 to 0.6 kg. of resin per hour ° C. of the melting temperature.

7. The method of claim 1, wherein the thermoplastic resin is polyethylene, and is being fed to said zone at a rate of for each 0.6 to 1.5 kg. of resin per hour ° C. of the melting temperature.

8. Apparatus for granulating pieces of thermoplastic resin film comprising means for preliminary cutting of thermoplastic synthetic resin films into pieces, means for conveying said film pieces to a feeding station, means for feeding said film pieces at said feeding station into a housing, means for producing frictional heat in said housing, and means for generating a stream of air, the means for preliminary cutting said thermoplastic synthetic resin film into said pieces including a screen having a mesh of about 8 to 12 mm., said conveying means interconnecting said cutting means and said feeding means, which latter is in communication with the means for producing frictional heat, the latter comprising two cooperating, spaced friction disc members which are rotatable relative to each other and are axially slidable with respect to each other, thereby producing frictional heat, the amount of which depends upon the particular thermoplastic synthetic resin so that the film pieces fed into the housing melt together at least into the size of granules, said means for producing frictional heat being accommodated in said housing to which is attached the means for generating an air stream for cooling said friction disc members and removing said granules from said housing.

9. The apparatus of claim 8, wherein the means for producing an air stream communicates through a pipeline with means for finish-cutting, said latter means including a screen having a mesh of about 5 to 8 mm.

10. The apparatus of claim 8, wherein the means for conveying the film pieces comprise a blower, a pipeline, and a separator, said blower being at its negative pressure side in communication with the means for preliminary cutting and at its positive pressure side with said separator through said pipeline, said separator communicating with the means for feeding the film pieces into the housing accommodating the means for producing the frictional heat.

11. The apparatus of claim 8, wherein the means for producing the frictional heat comprise a stationary disc and a rotatable disc, said discs having teeth arranged thereon along concentric circles, the arrangement being such that the teeth of one of said discs interact with the teeth of the other of said discs, the teeth arranged along adjacent concentric circles being smaller than the teeth arranged along the corresponding, next inner circle, each of said discs having a non-toothed peripheral portion which has a width of about one-fourth to one-third the disc radius, each of said non-toothed peripheral portions having a plurality of slots cut therein, each of which extends along a line inclined with respect to the corresponding disc radius and terminates at least in proximity to the periphery of the respective disc.

12. The apparatus of claim 8, wherein the means for producing the frictional heat comprise a stationary disc and a rotatable disc, said discs having teeth arranged thereon along concentric circles, the arrangement being such that the teeth of one of said discs interact with the teeth of the other one of said discs, the teeth arranged along adjacent concentric circles being smaller than the teeth arranged along the corresponding, next inner circle, said rotatable disc having teeth arranged thereon along concentric circles, the toothed area of the rotatable disc extending substantially from the central feeding inlet of said disc to the outer periphery of said disc.

13. The apparatus of claim 11, wherein at least one wing-shaped element is disposed on the rotatable disc at the lower side thereof, said wing-shaped element projecting from the disc periphery and having an outwardly extending portion which overlaps the periphery portion of the stationary disc.

14. The apparatus of claim 12, where at least one wing-shaped element is disposed on the rotatable disc at the lower side thereof, said wing-shaped element projecting from the disc periphery and having an outwardly extending portion which rises above the peripheral portion of the rotatable disc.

15. The apparatus of claim 8, wherein the feeding means is connected to a variable-speed driving mechanism.

16. The apparatus of claim 15, further comprising controlling means for controlling the rate of feeding of said film pieces in response to the temperature in said zone, said controlling means including a heat sensing element inserted in the stationary disc, and an electric control bridge circuit connected between the heat sensing element and the driving mechanism.

References Cited

UNITED STATES PATENTS

| | | | |
|---|---|---|---|
| 2,211,518 | 8/1940 | Scherbaum | 18—2 X |
| 2,862,350 | 12/1958 | King et al. | |
| 3,000,055 | 9/1961 | Schlicksupp. | |
| 3,000,618 | 9/1961 | Oakes | 18—12 X |
| 3,193,601 | 7/1965 | Billingsley. | |

JAMES A. SEIDLECK, *Primary Examiner.*

P. E. ANDERSON, *Assistant Examiner.*